(12) United States Patent
Bawel

(10) Patent No.: US 9,069,439 B2
(45) Date of Patent: Jun. 30, 2015

(54) GRAPHICAL USER INTERFACE WITH CUSTOMIZED NAVIGATION

(75) Inventor: Paul Frederick Bawel, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 13/084,497

(22) Filed: Apr. 11, 2011

(65) Prior Publication Data

US 2012/0260218 A1    Oct. 11, 2012

(51) Int. Cl.
    *G06F 3/048*    (2013.01)
    *G06F 3/0481*   (2013.01)

(52) U.S. Cl.
    CPC .................. *G06F 3/04815* (2013.01)

(58) Field of Classification Search
    USPC .................................. 715/841, 854
    See application file for complete search history.

(56) References Cited

U.S. PATENT DOCUMENTS

| | | | |
|---|---|---|---|
| 5,297,032 A | 3/1994 | Trojan et al. | |
| 5,321,750 A | 6/1994 | Nadan | |
| 5,339,392 A | 8/1994 | Risberg et al. | |
| 5,432,932 A | 7/1995 | Chen et al. | |
| 5,812,134 A * | 9/1998 | Pooser et al. | 715/848 |
| 5,819,284 A | 10/1998 | Farber et al. | |
| 5,959,621 A | 9/1999 | Nawaz et al. | |
| 6,188,405 B1 | 2/2001 | Czerwinski et al. | |
| 6,216,141 B1 | 4/2001 | Straub et al. | |
| 6,278,448 B1 | 8/2001 | Brown et al. | |
| 6,311,058 B1 | 10/2001 | Wecker et al. | |
| 6,449,638 B1 | 9/2002 | Wecker et al. | |
| 6,456,334 B1 | 9/2002 | Duhault | |
| 6,510,553 B1 | 1/2003 | Hazra | |
| 6,724,403 B1 | 4/2004 | Santoro et al. | |
| 6,807,558 B1 | 10/2004 | Hassett et al. | |
| 6,829,621 B2 * | 12/2004 | Keller | 707/812 |
| 6,832,355 B1 | 12/2004 | Duperrouzel et al. | |
| 6,976,210 B1 | 12/2005 | Silva et al. | |
| 7,028,264 B2 | 4/2006 | Santoro et al. | |
| 7,376,907 B2 | 5/2008 | Santoro et al. | |
| 7,562,312 B2 | 7/2009 | Rochford et al. | |

(Continued)

FOREIGN PATENT DOCUMENTS

WO    WO 99/26127    5/1999

OTHER PUBLICATIONS

International Search Report and Written Opinion for PCT/US2012/032940, dated Oct. 31, 2012, 9 pages.

(Continued)

*Primary Examiner* — William Bashore
*Assistant Examiner* — Henry Orr
(74) *Attorney, Agent, or Firm* — Jim Banowsky; Kate Drakos; Micky Minhas

(57) ABSTRACT

The present application relates to a multi-dimensional icon that includes a plurality of panels linked together in a user-configurable structure. Based on user input, such as a flick or other gesture, the multi-dimensional icon can rotate to the next of a series of linked panels. In one embodiment, each linked panel can also have functionality or content associated therewith that is customizable by the user. For example, the user can select the panel to launch an application, a web page, or view content (e.g., a photo). In another embodiment, data can also be associated with a panel so that if the user selects the panel, an application can be launched or a website opened, using the data as a customization parameter.

21 Claims, 14 Drawing Sheets

(56) References Cited

U.S. PATENT DOCUMENTS

| | | | |
|---|---|---|---|
| 7,694,236 B2 | 4/2010 | Gusmorino et al. | |
| 7,933,632 B2 | 4/2011 | Flynt et al. | |
| 7,987,431 B2 | 7/2011 | Santoro et al. | |
| 8,132,120 B2* | 3/2012 | Stallings et al. | 715/848 |
| 2003/0020671 A1* | 1/2003 | Santoro et al. | 345/1.3 |
| 2004/0221243 A1* | 11/2004 | Twerdahl et al. | 715/834 |
| 2006/0190833 A1 | 8/2006 | SanGiovanni et al. | |
| 2008/0091526 A1* | 4/2008 | Shoemaker | 705/14 |
| 2008/0307360 A1 | 12/2008 | Chaudhri et al. | |
| 2009/0019348 A1* | 1/2009 | King | 715/205 |
| 2009/0144376 A1* | 6/2009 | Moscatelli et al. | 709/206 |
| 2009/0164923 A1* | 6/2009 | Ovi | 715/764 |
| 2010/0050129 A1* | 2/2010 | Li et al. | 715/849 |
| 2010/0058193 A1* | 3/2010 | Sherrard et al. | 715/738 |
| 2010/0058248 A1 | 3/2010 | Park | |
| 2010/0088639 A1 | 4/2010 | Yach et al. | |
| 2010/0093400 A1 | 4/2010 | Ju et al. | |
| 2010/0169836 A1* | 7/2010 | Stallings et al. | 715/848 |
| 2010/0262928 A1 | 10/2010 | Abbott | |
| 2010/0293056 A1 | 11/2010 | Flynt et al. | |
| 2010/0315417 A1 | 12/2010 | Cho et al. | |
| 2011/0065478 A1 | 3/2011 | Kim et al. | |
| 2011/0167383 A1* | 7/2011 | Schuller et al. | 715/808 |
| 2011/0225547 A1 | 9/2011 | Fong et al. | |
| 2012/0102400 A1* | 4/2012 | Worley et al. | 715/702 |
| 2012/0102437 A1* | 4/2012 | Worley et al. | 715/863 |
| 2012/0204191 A1* | 8/2012 | Shia et al. | 719/318 |

OTHER PUBLICATIONS

"Office Action Issued in European Patent Application No. 12771881.5", Mailed Date: Dec. 18, 2014, 6 Pages.

"Search Report Issued in European Patent Application No. 12771881.5", Mailed Date: Nov. 17, 2014, 3 Pages.

Lai, "App review:SPB Shell 3D for Android," Apr. 5, 2011, 4 pages.

"BumpTop 3D: a multi-touch desktop," *IfYouHardware*, May 4, 2010, 3 pages.

Mishra, "Inventions on three dimensional GUI," retrieved Apr. 19, 2011, 13 pages.

* cited by examiner

GRAPHICAL USER INTERFACE WITH CUSTOMIZED NAVIGATION

FIELD

The present application concerns graphical user interfaces, and, more particularly, customizing navigation in such user interfaces.

BACKGROUND

Mobile or portable devices have become increasingly popular and prevalent in today's society. Many users utilize a mobile device, such as a mobile phone, as their primary means of communication. Mobile devices can include multiple functions such as cellular phone service, voice over Internet protocol ("VoIP"), software applications, email access, Internet capabilities, calendar functions, music players and the like. Functions, features and capabilities have increased both the utility and complexity of mobile devices. It is likely that functions will continue to be added to mobile devices further increasing both usefulness and intricacy.

A graphical user interface is a part of a mobile device used for manipulating and controlling functionality. A graphical user interface typically starts with a default screen (also called a home screen or start screen), which includes a plurality of icons. Each icon is a graphic symbol that represents a program, command or data file that can be launched or opened upon selection of the icon.

Generally, there is a one-to-one relationship between an icon and the program, command or data file associated with the icon. Thus, each icon on the user interface is its own discrete image and is independent and often unrelated to other icons on the user interface. Additionally, there is little or no ability to aggregate or connect icons in a logical manner.

Users are placing more and more icons on their default screen as the number of available applications (particularly for phones) expands. At the same time, mobile phone sizes are constantly pressured to be reduced, which impacts screen size. The result is often an unwieldy number of icons with little or no organization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present application relates to a multi-dimensional icon that includes a plurality of panels linked together in a user-configurable structure. Based on user input, such as a flick, gesture or other command, the multi-dimensional icon can change to the next of a series of linked panels.

In one embodiment, each linked panel can also have functionality or content associated therewith that is customizable by the user. For example, the user can select the panel to launch an application, a web page, or view content.

In another embodiment, data can also be associated with a panel so that if the user selects the panel, an application can be launched or a website opened, using the data as a customization parameter.

In still another embodiment, the multi-dimensional icon can have a shimmer or vibration or some other indication that multiple dimensions are available.

In still yet another embodiment, the panels can be dynamically updated based on a received push-notification.

The foregoing and other objects, features, and advantages of the invention will become more apparent from the following detailed description, which proceeds with reference to the accompanying figures.

DETAILED DESCRIPTION

Figure 1:
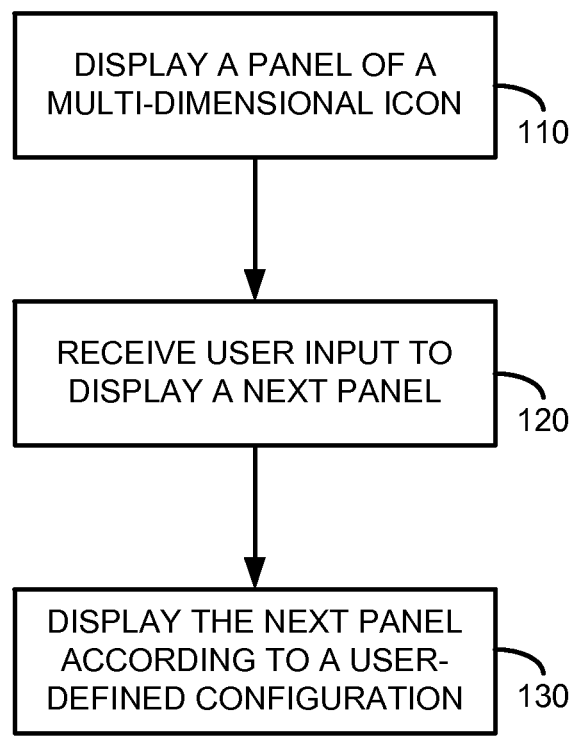
FIG. 1 is a flowchart of a method for displaying panels in a customizable, multi-dimensional icon.

FIG. 1 shows an embodiment of a method for displaying a multi-dimensional icon. The multi-dimensional icon can take many forms. For example, it can comprise multiple panels, with each panel displayed one at a time as a user performs a command to rotate, shift, slide or otherwise move or change to display the next panel in a customized ordered sequence of panels. For simplicity, this application will refer to any such move or change as a rotation. Alternatively, the multi-dimensional icon can have the appearance of a three-dimensional image (e.g., cube or some other geometric shape) with multiple panels shown simultaneously. In either case, the multi-dimensional icon typically displays a current active panel and a plurality of other panels that are or can become active through user input. For example, the user can rotate the multi-dimensional icon to a desired panel. By rotating, it is meant that the icon maintains its location on the user interface default screen, but changes its current panel through the appearance of a rotation or change in three dimensions. Alternatively, the multi-dimensional icon can have several panels that can be displayed at the same time that are selectable. In any event, it is understood that a user interface is a two-dimensional screen and any discussion of three-dimensions is merely discussing a three-dimensional representation. Additionally, it is understood that the multi-dimensional icon can include a group of individually configurable panels. Generally, the multi-dimensional icon covers about the same portion of a display in all the above configurations.

In process block 110, a panel of the multi-dimensional icon is displayed and is considered the current active panel. The panel can include an image and/or text. In process block 120, a client device receives user input to rotate the icon, meaning that the user input is such to direct the user interface to change the panel. When the panel is transitioned to the next panel, the size and position of the multi-dimensional icon can remain the same, so as not to obscure other icons and maximize available space of the user interface. The user input can take a variety of forms, such as a flick operation, voice operation, etc. In process block 130, a next panel is displayed in a series of panels that are defined according to a user configuration. The user can define virtually any desired linking between panels so that the linking is customizable by the user.

Figure 2:
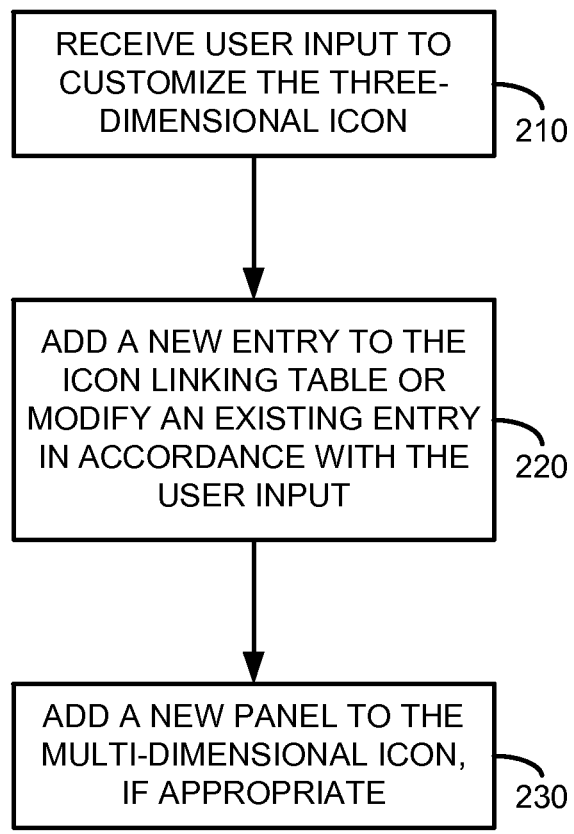
FIG. 2 is a flowchart of a method for customizing a multi-dimensional icon.

FIG. 2 is a flowchart of a method for customizing the linking of the three-dimensional icon to provide a user-configurable structure. In process block 210, user input is received to customize the three-dimensional icon. The customization can be through a module used to build the three-dimensional icon or through a simple on-page command to pin a current page or page function to a three-dimensional icon or a drag-and-drop operation. There are a variety of well-known customization techniques, such as on-screen menus, gestures, voice commands, and others, and the particular technique used depends on the design. In process block 220, in response to the user input, a new entry is added to an icon linking table, described below, or an existing entry in the table is modified. In process block 230, a new panel is added to the multi-dimensional icon.

Figure 3:
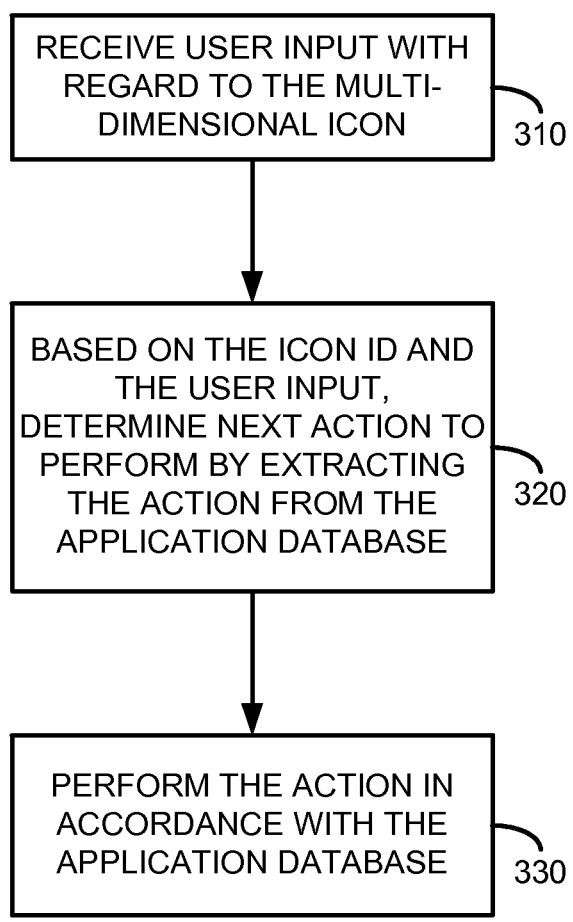
FIG. 3 is a flowchart of a method showing further details on how the multi-dimensional icon carries out actions.

FIG. 3 is a flowchart of an embodiment showing how a database is used to display a next panel in a sequence. In process block 310, user input is received with regard to the multi-dimensional icon. The user input can be a request to rotate the multi-dimensional icon or a selection of a panel. In process block 320, based on the icon identification and user input, the system determines the next action to perform by extracting the action from the database. In process block 330, the action is performed in accordance with the database. If the action is to rotate the multi-dimensional icon, then the next panel in the sequence is made a current panel. If a selection is made, then an application can be launched, a web page loaded, a sub-level displayed, panel content or further panel information can be displayed, etc. Virtually any act can be performed in response to selection by the user and in accordance with the user configuration.

Figure 4:
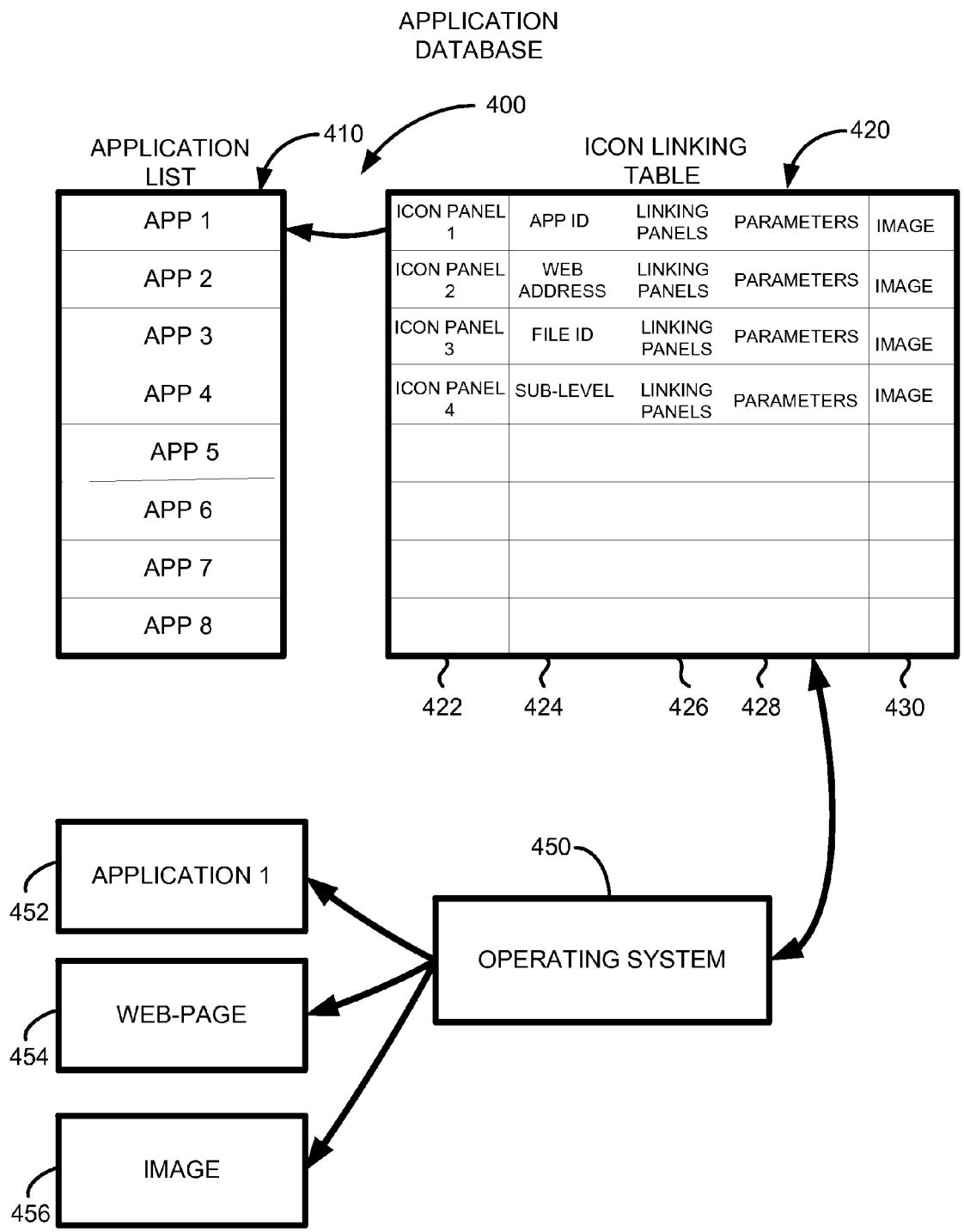
FIG. 4 is an example system structure that can be used including an application database.

FIG. 4 shows an application database 400 as including an application list 410 and an icon linking table 420. The application list 410 is a list of currently available applications on a client device. The icon linking table 420 includes a number of fields. Example fields include an icon panel identification 422, which lists all of the icon panels associated with a multi-dimensional icon, a selection field 424, which is an action to take upon selection, a linking panel field 426, which shows panels and direction associated with the current active panel, a parameters field 428, which includes data that can be passed to an application or website, and an image field 430, which includes an image and text that can be used in displaying the panel. The table can also include a list (not shown) of available icons on the user interface. Either each multi-dimensional icon can have its own linking table or all icons can be placed in a single table. An operating system 450 can access the database 400 to decide what action to take in response to user input. For example, an application 452 can be launched, a webpage 454 can be opened, or an image 456 can be opened. These are just examples of actions that can be performed. Additionally, any parameters can be passed to the website or application to customize it according to user preferences. When a user rotates the multi-dimensional icon, depending on the direction of rotation, the next panel displayed can be determined by the linking panel field. For example, if a right rotation is performed, the linking panel field 426 can provide an associated icon panel identification to use after rotation to the right. The acquired icon panel identification can be used as a key to the icon linking table to obtain the image associated with the next panel displayed. The operating system 450 obtains panel link output data from the icon linking table 420 in order to rotate the multi-dimensional icon. When building the icon linking table 420, the operating system provides panel link input data to the table.

Figure 5A:
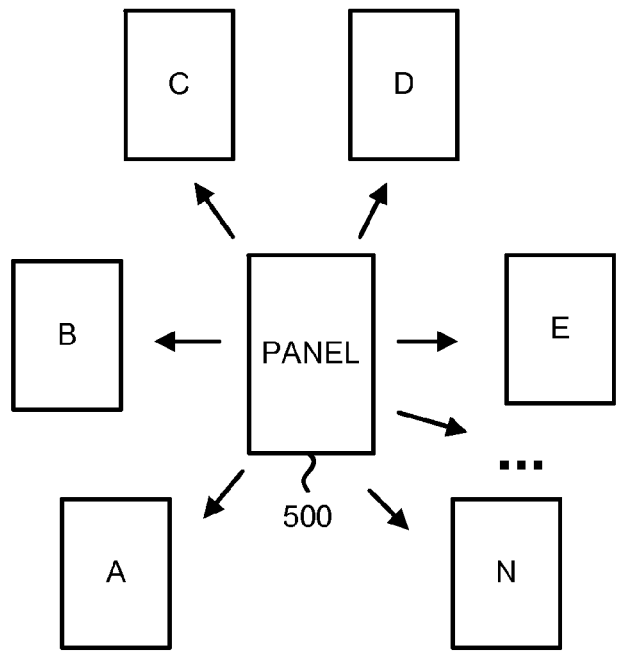
FIGS. 5A and 5B show different examples of multi-dimensional icons.
Figure 5B:
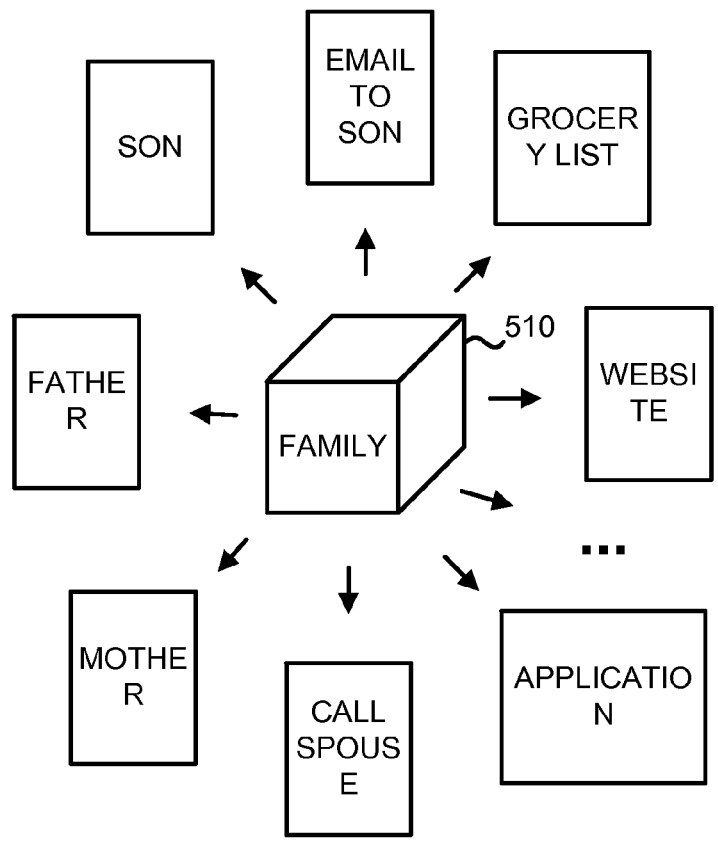

FIG. 5A shows an example panel with multiple panels linked thereto. Virtually any number of other panels can be linked to the panel. In FIG. 5B, a very specific example is shown wherein a multi-dimensional icon 510 is shown that is associated with a family. On a first panel the word "family" is displayed as the user can customize the panel to display or generate whatever text, information, image, graphic, sound and/or haptic is desired. The other panels are shown as associated with the family icon through links. For example, rotating to the "application" panel allows a user to launch an application related to the family in some way. The "email to son" panel can launch an email application with input data to populate the email. Thus, the son's email address can be already in the email when the application is launched by using the parameters field in the icon linking table. The "Father" icon can be an image or if selected can provide a further sub-level of panels related to the father. Thus, as can be seen, the panels can be text, applications, websites, etc. A user can designate any one of these panels to be the default display panel. The default panel may be pinned to the home screen of the device, or to any other level or position in a user interface that supports navigation between user functions and features.

Figure 6A:
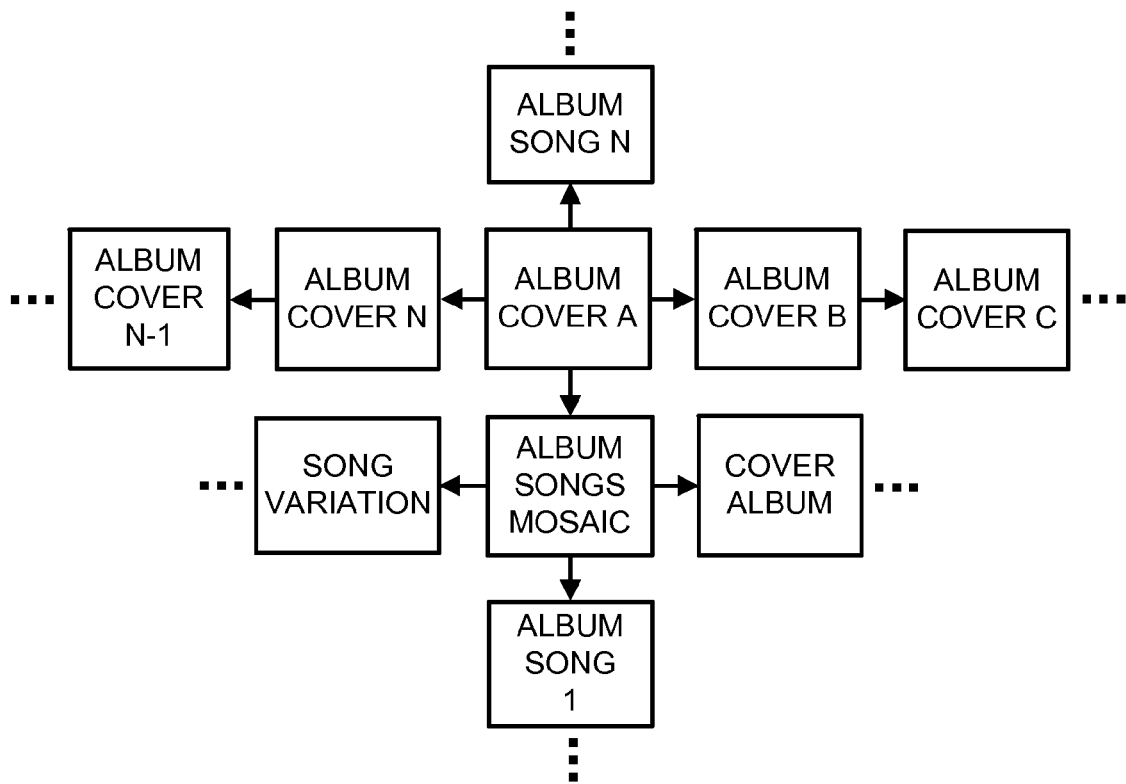
FIGS. 6A and 6B show different examples of multi-dimensional icons.

FIG. 6A shows an example with a specific linking pattern to an "Album Cover A" panel. If the user rotates the icon right, the Album Cover B is displayed. A rotate right again causes the Album Cover C to be displayed. A rotate down from Album Cover A reveals a panel "Album Songs Mosaic." From that panel, the user can rotate the icon right, left or down, etc. Thus, the user can control the organization of the links and can make virtually any desired sequence of panels that can be displayed in response to user input.

Figure 6B:
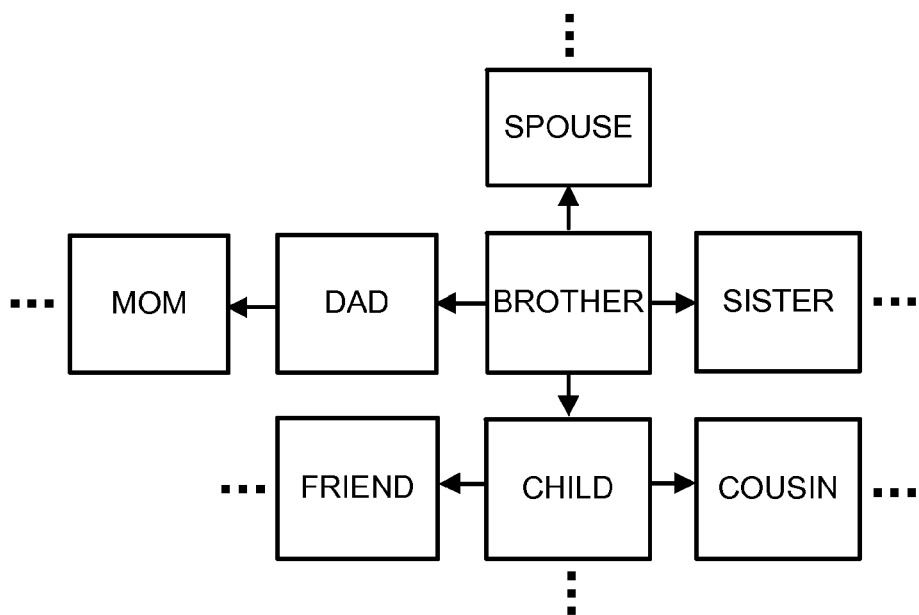

FIG. 6B provides a similar example where from a "brother" panel, the user can rotate right, left, up or down to reveal different customized panels that can show additional content or function.

Figure 7:
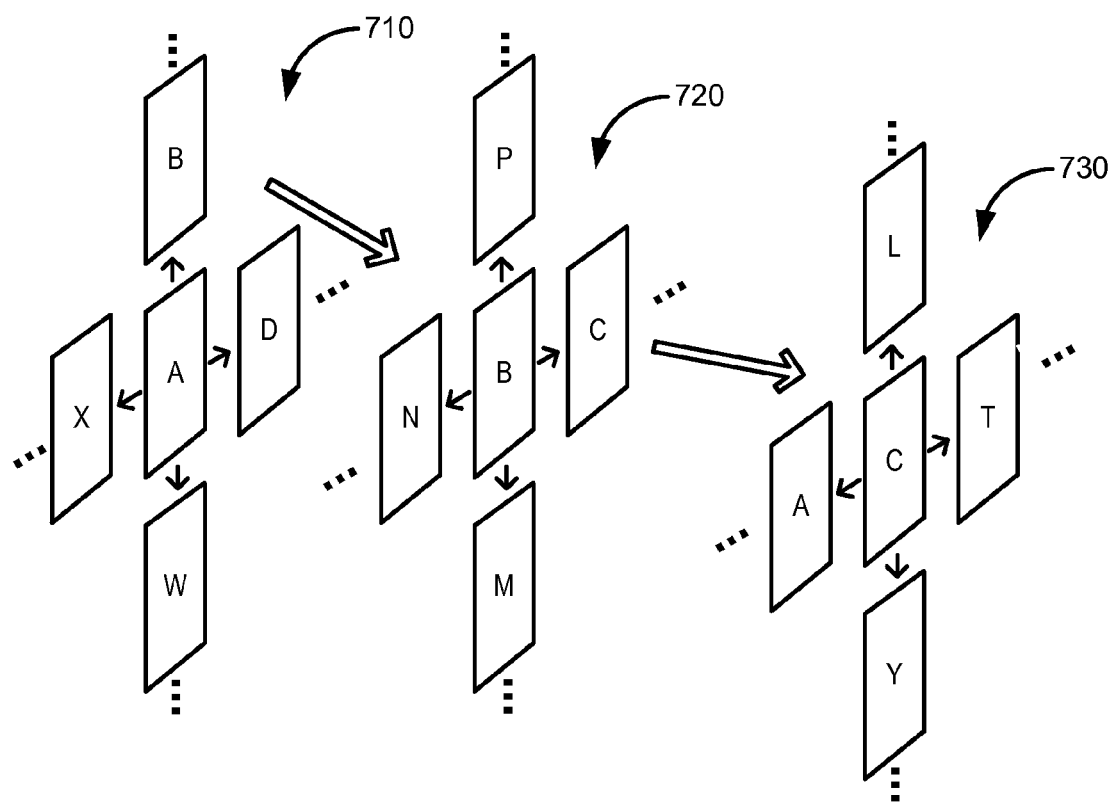
FIG. 7 shows a main level and sub-levels that can be used in a multi-dimensional icon.

FIG. 7 shows a multi-level example of a multi-dimensional icon. A first level 710 is displayed. If the user selects panel B of level 710, they jump to a linked sub-level 720 where they can rotate and link to panels C, M, N, P, etc. at the same sub-level. If the user selects C, they go to yet another level 730. Notably, there is a panel A that can allow the user to jump back to level 710. Any different configuration of levels can be used as defined by the user.

Figure 8:
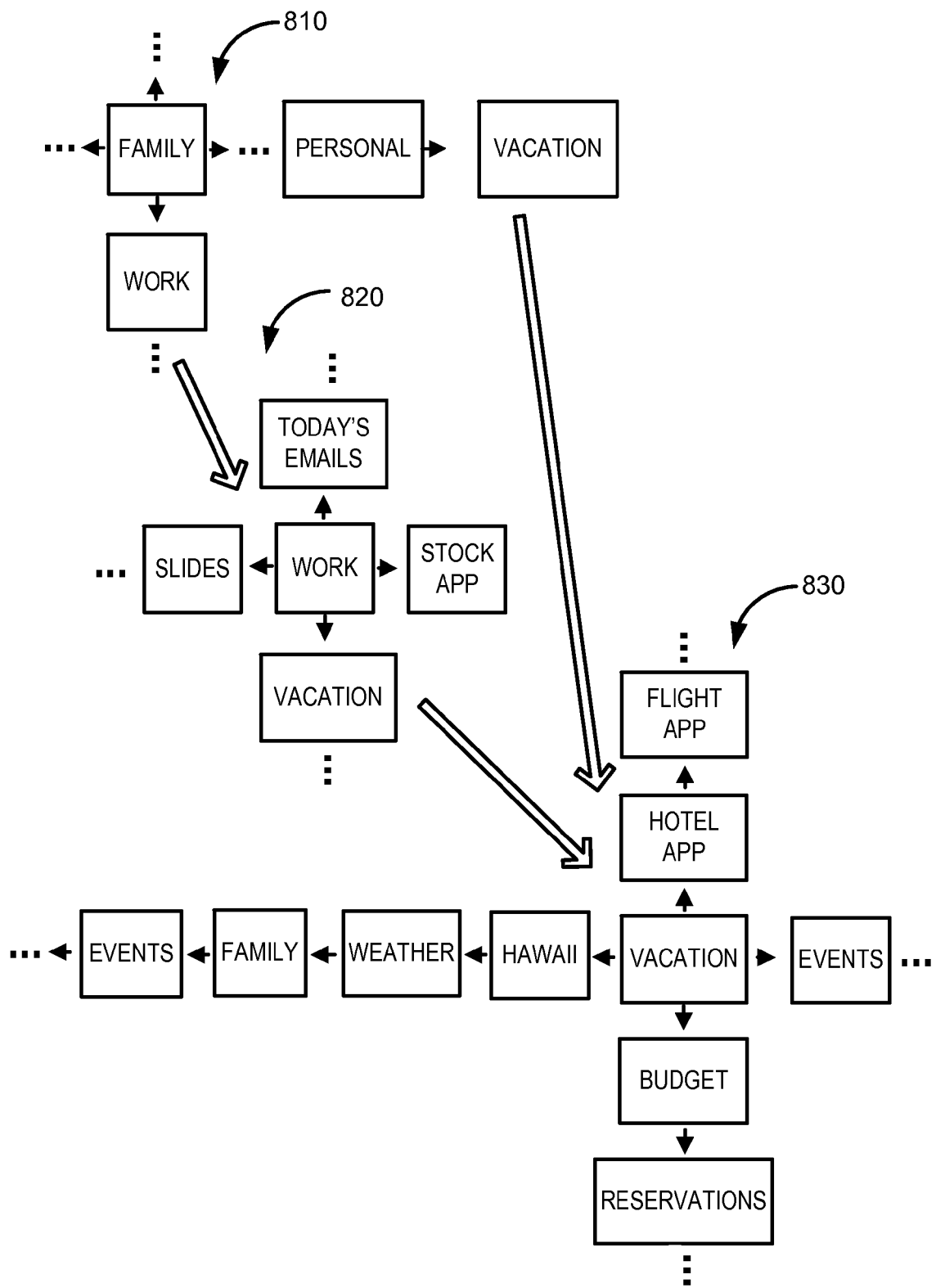
FIG. 8 shows a multi-level example that can be used with the multi-dimensional icon.

FIG. 8 is another multi-level example, wherein if a user selects a "work" panel at level 810, then level 820 is displayed. The user can then rotate the multi-dimensional icon up, down, right or left to reveal applications, emails, etc. The same panel can appear in multiple locations of the customized user interface. If the user selects "vacation" from either 810 or 820, the level 830 is displayed. The user can then organize all vacation-related panels on level 830.

Figure 9A:
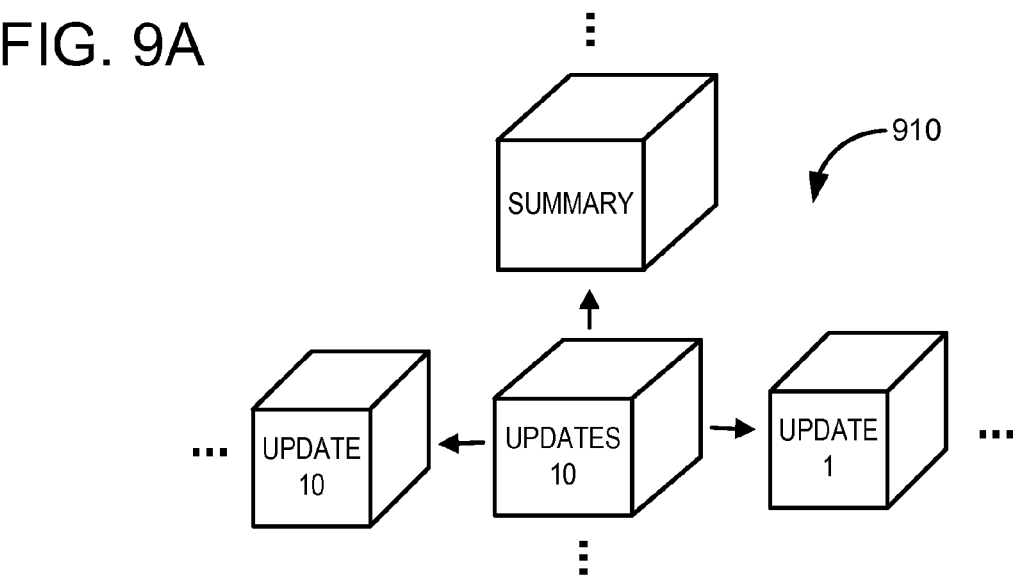
FIGS. 9A and 9B show dynamic updates and a gesture rejecting an update.
Figure 9B:
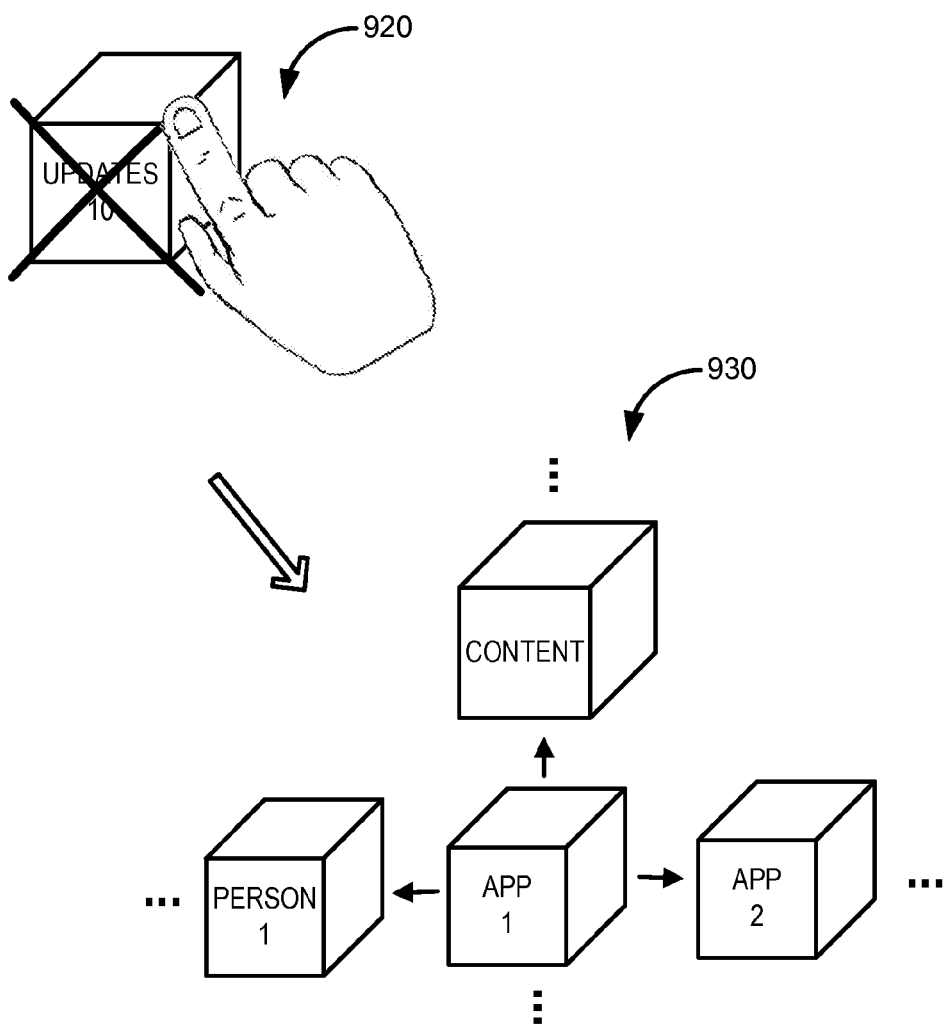

FIG. 9 shows an example of how panels can be updated dynamically through push notifications. A subset 910 of only updated panels can be automatically created so that the user can view only updated panels. Thus, the multi-dimensional icon can be modified, setup, selected or otherwise configured to include only a subset of panels that have been dynamically updated. Thus, the multi-dimensional icon can be reorganized based on one or more events. The user can perform a gesture, such as shown at 920, to either cancel out of the updates for all of the panels or for each panel individually, and return to the previously displayed multi-dimensional icon 930 or the user can simply cancel an individual notification. The user can configure each multi-panel icon to default to always provide access to all panels, to just those panels which indicate new information, or to a subset thereof.

Figure 10:
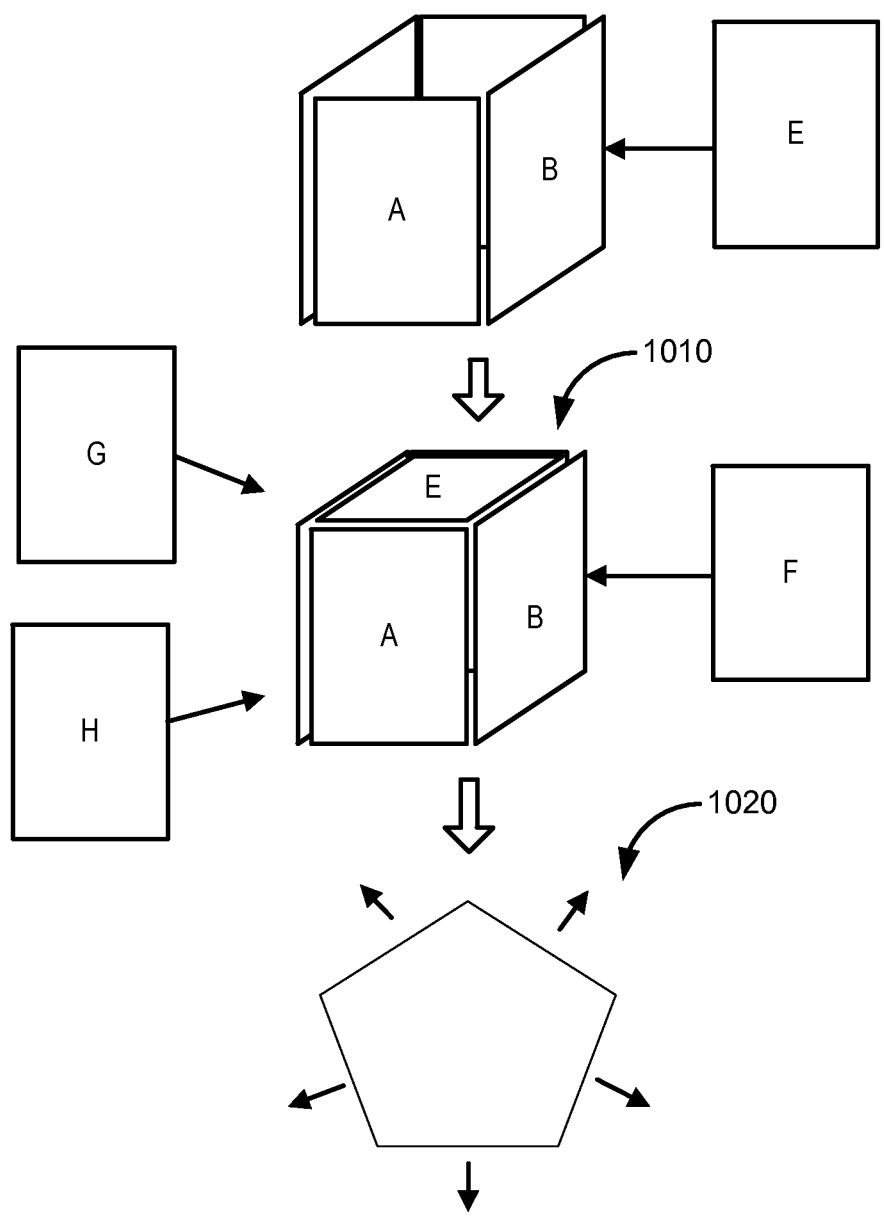
FIG. 10 shows a three-dimensional representation of the multi-dimensional icon.

FIG. 10 shows an example of a multi-dimensional icon 1010 that is built as a cube. First, panels A, B, C, and D are linked together. Then panel E can be linked to form an open-side cube. Then panels F, G, and H are added to build a multi-sided icon shown at 1020. The user can build the three-dimensional shape to appear as any geometric figure.

Figure 11A:
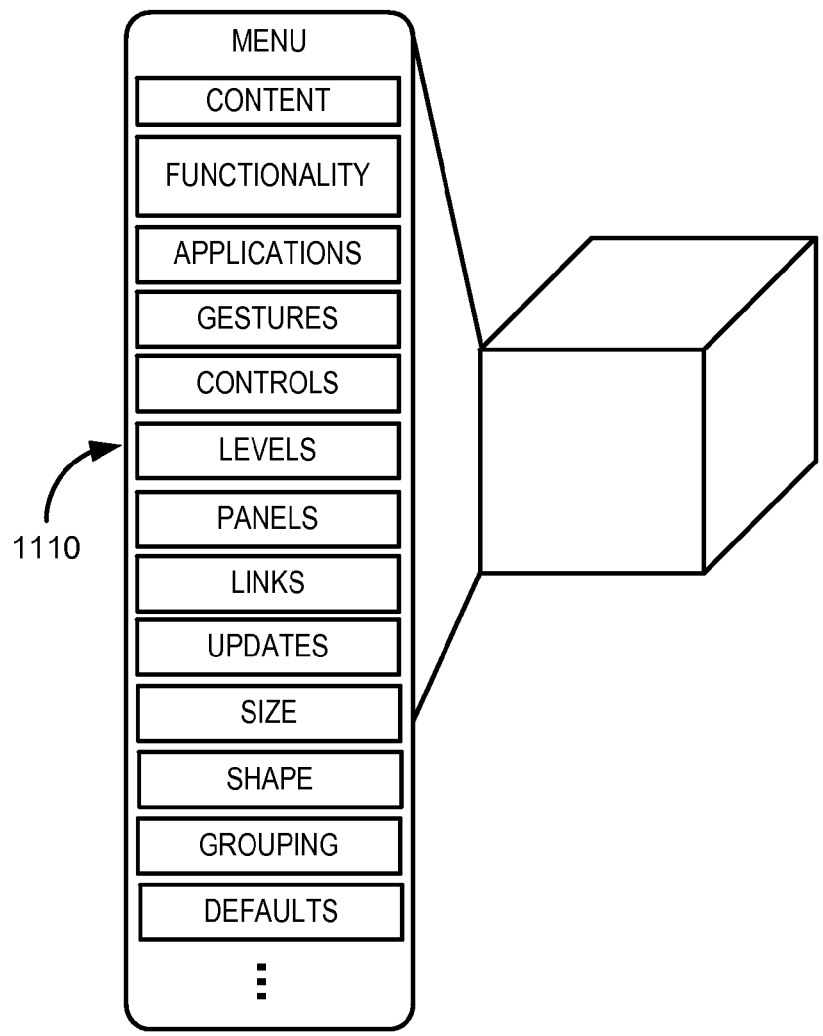
FIGS. 11A and 11B show different customization possibilities and a drag-and-drop operation to perform customization.
Figure 11B:
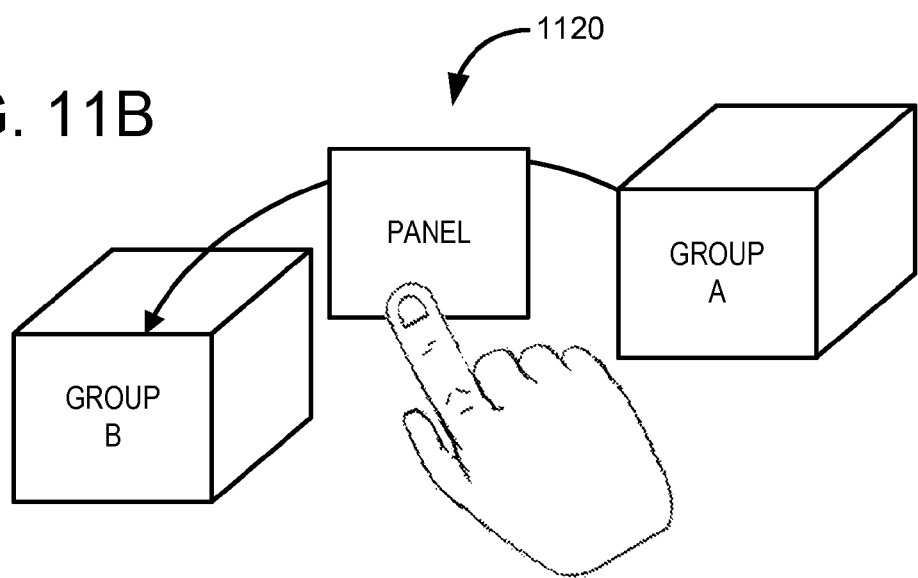

FIG. 11A shows a menu 1110 that can be used to customize any of a variety of parameters associated with the multi-dimensional icon including, content, functionality, applications, gestures, controls, levels, panels, links, updates, size, shape, grouping, and defaults. Each of these menu items can be customized by the user for any panel in the multi-dimensional icon. FIG. 11B shows how the grouping can be changed through a drag-and-drop operation. A user drags a panel 1120 from a group A to a group B in order to customize group B. Drag-and-drop operations are just one of the examples of how customization can be performed. If a user desires to have a panel in both group A and group B, the user may perform a copy along with the drag and drop, or could navigate to the group B icon and add the desired panel in the desired location as described previously.

Figure 12A:
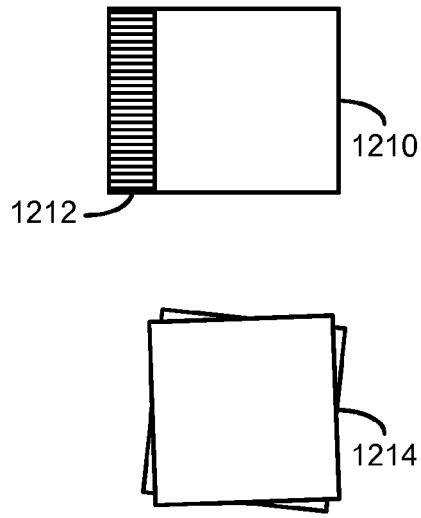
FIGS. 12A and 12B show different configurations of a multi-dimensional icon.

FIG. 12A shows different techniques for illustrating to a user that the icon is multi-dimensional. For example, a panel 1210 can have a colored bar 1212 to indicate a rotational direction. Alternatively, a panel 1214 can vibrate or shimmer to indicate that it is multi-dimensional.

Figure 12B:
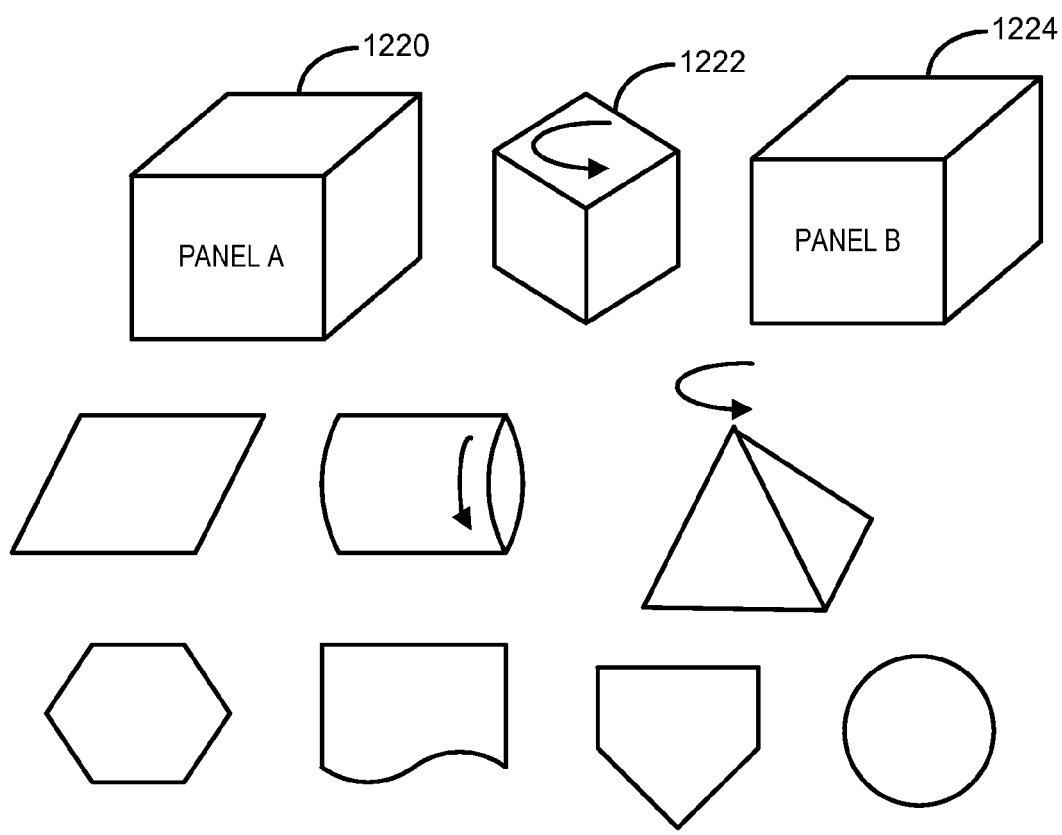

FIG. 12B shows a multi-dimensional icon 1220 showing panel A as an active panel and being rotated as shown at 1222 in response to user input to change the icon to having an active panel B at 1224. Other example geometric shapes are shown and include cylinders, pyramids, spheres, etc.

Figure 13:
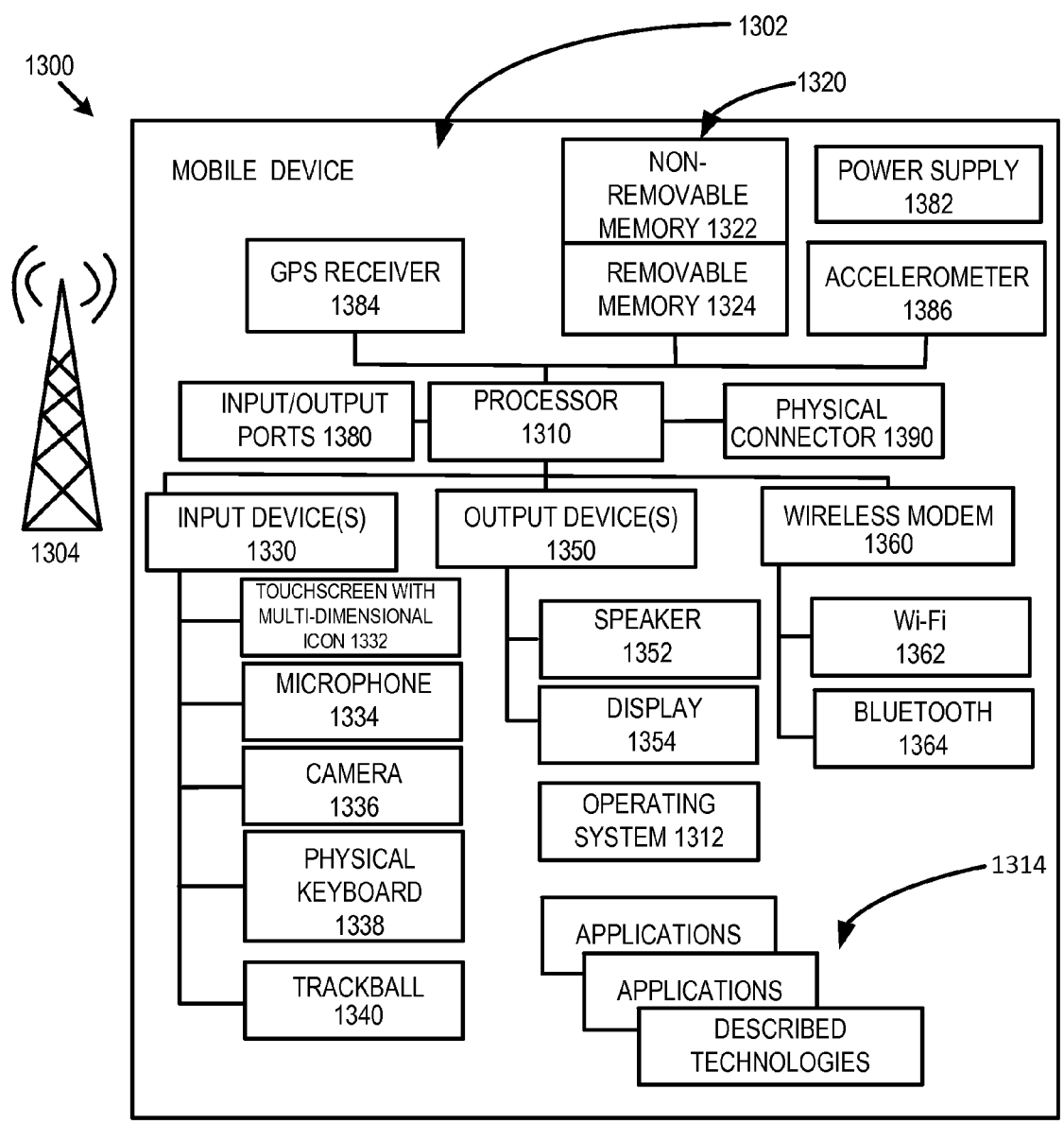
FIG. 13 is an example mobile phone that can be used with the multi-dimensional icon.

FIG. 13 is a system diagram depicting an exemplary mobile device 1300 including a variety of optional hardware and software components, shown generally at 1302. Any components 1302 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1304, such as a cellular or satellite network.

The illustrated mobile device 1300 can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components 1302 and support for one or more application programs 1314. The application programs can include common mobile computing applications (e.g. email applications, calendars, contact managers, web browsers, messaging applications), or any other computing application.

The illustrated mobile device 1300 can include memory 1320. Memory 1320 can include non-removable memory 1322 and/or removable memory 1324. The non-removable memory 1322 can include RAM, ROM, flash memory, a hard disk, or other well-known memory storage technologies. The removable memory 1324 can include flash memory or a Subscriber Identity Module (SIM) card, which is well known in GSM communication systems, or other well-known memory storage technologies, such as "smart cards." The memory 1320 can be used for storing data and/or code for running the operating system 1312 and the applications 1314. Example data can include web pages, text, images, sound files, video data, or other data sets to be sent to and/or received from one or more network servers or other devices via one or more wired or wireless networks. The memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1300 can support one or more input devices 1330, such as a touch screen 1332 (which can display the multi-dimensional icon), microphone 1334, camera 1336, physical keyboard 1338 and/or trackball 1340 and one or more output devices 1350, such as a speaker 1352 and a display 1354. Other possible output devices (not shown) can include piezoelectric or other haptic output devices. Some devices can serve more than one input/output function. For example, touchscreen 1332 and display 1354 can be combined in a single input/output device.

A wireless modem 1360 can be coupled to an antenna (not shown) and can support two-way communications between the processor 1310 and external devices, as is well understood in the art. The modem 1360 is shown generically and can include a cellular modem for communicating with the mobile communication network 1304 and/or other radio-based modems (e.g., Bluetooth or Wi-Fi). The wireless modem 1360 is typically configured for communication with one or more cellular networks, such as a GSM network for data and voice communications within a single cellular network, between cellular networks, or between the mobile device and a public switched telephone network (PSTN).

The mobile device can further include at least one input/output port 1380, a power supply 1382, a satellite navigation system receiver 1384, such as a Global Positioning System (GPS) receiver, an accelerometer 1386, and/or a physical connector 1390, which can be a USB port, IEEE 1394 (FireWire) port, and/or RS-232 port. The illustrated components 1302 are not required or all-inclusive, as any components can deleted and other components can be added.

Figure 14:
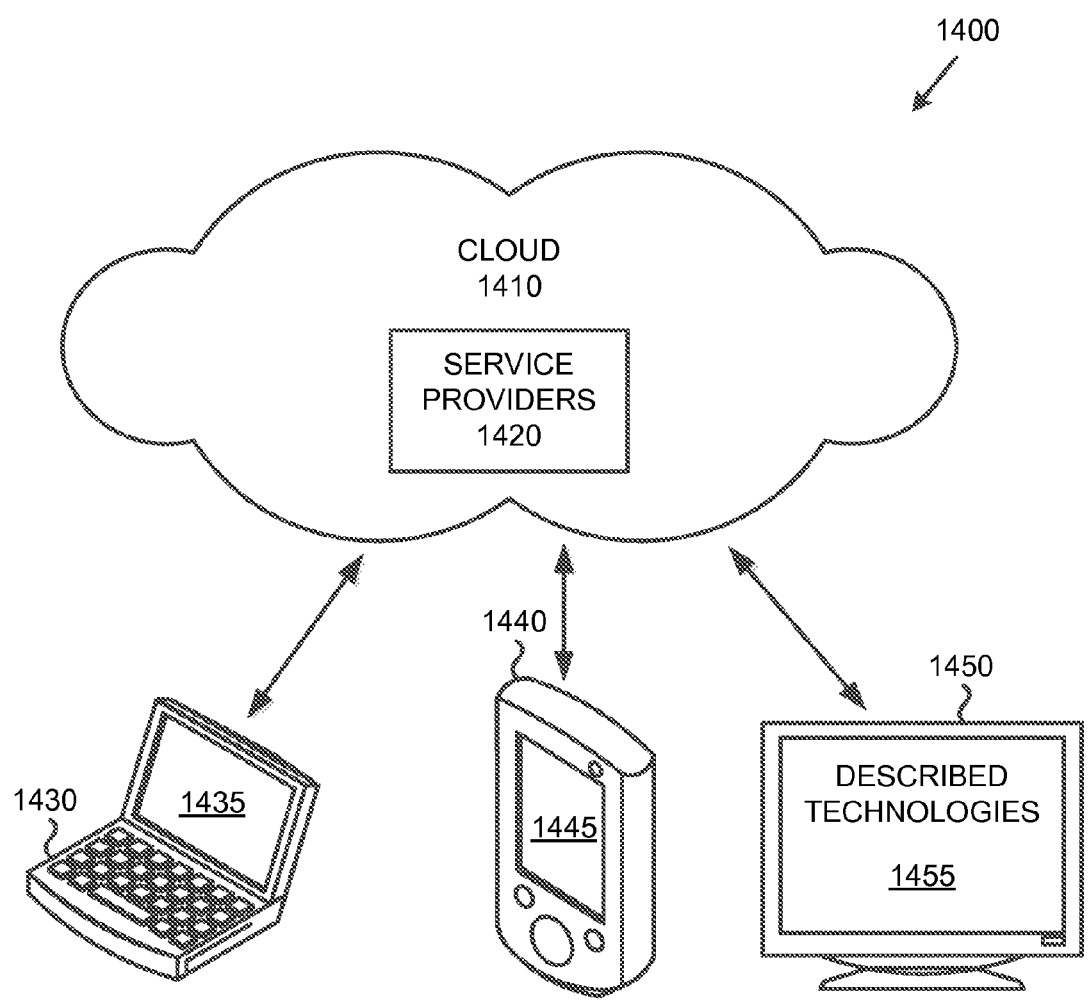
FIG. 14 is an example of a cloud environment that can be used with the multi-dimensional icon.

FIG. 14 illustrates a generalized example of a suitable implementation environment 1400 in which described embodiments, techniques, and technologies may be implemented.

In example environment 1400, various types of services (e.g., computing services) are provided by a cloud 1410. For example, the cloud 1410 can comprise a collection of computing devices 1430, 1440, 1450, which may be located centrally or distributed, that provide cloud-based services to various types of users and devices connected via a network such as the Internet. The implementation environment 1400 can be used in different ways to accomplish computing tasks. For example, some tasks (e.g., processing user input and presenting a user interface) can be performed on local computing devices (e.g., connected devices 1430, 1440, 1450) while other tasks (e.g., storage of data to be used in subsequent processing) can be performed in the cloud 1410. In the particular example, the multi-dimensional icon can be customized and the customization can be extended across all of the different devices using the cloud. In such a way, a user can have unified settings across platforms. One technique for customizing across devices is to store the icon linking table in the cloud 1410.

In example environment 1400, the cloud 1410 provides services for connected devices 1430, 1440 1450 with a variety of screen capabilities. Connected device 1430 represents a device with a computer screen 1435 (e.g., a mid-size screen). For example, connected device 1430 could be a personal computer such as desktop computer, laptop, notebook, netbook, or the like. Connected device 1440 represents a device with a mobile device screen 1445 (e.g., a small size screen). For example, connected device 1440 could be a mobile phone, smart phone, personal digital assistant, tablet computer, and the like. Connected device 1450 represents a device with a large screen 1455. For example, connected device 1450 could be a television screen (e.g., a smart television) or another device connected to a television (e.g., a set-top box or gaming console) or the like. One or more of the connected devices 1430, 1440, 1450 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1400. For example, the cloud 1410 can provide services for one or more computers (e.g., server computers) without displays.

Services can be provided by the cloud 1410 through service providers 1420, or through other providers of online services (not depicted). For example, cloud services can be customized to the screen size, display capability, and/or touch screen capability of a particular connected device (e.g., connected devices 1430, 1440, 1450).

In example environment 1400, the cloud 1410 provides the technologies and solutions described herein to the various connected devices 1430, 1440, 1450 using, at least in part, the service providers 1420. For example, the service providers 1420 can provide a centralized solution for various cloud-based services. The service providers 1420 can manage service subscriptions for users and/or devices (e.g., for the connected devices 1430, 1440, 1450 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

I claim:

1. A method of creating a multi-dimensional icon on a client device, comprising:
displaying a current panel in a multi-dimensional icon that includes a first plurality of panels linked together in a user-configurable structure, wherein the first plurality of panels are on a main level of a hierarchical structure;
receiving user input to display a next panel of the multi-dimensional icon;

displaying the next panel in the multi-dimensional icon in accordance with the user-configurable structure;

receiving user input to select the next panel; and upon receiving the user input, displaying a sub-level, which is a level below the main level in the hierarchical structure and which is associated with the next panel, the sub-level having a second plurality of panels that are associated with the next panel, different than the first plurality of panels, the sub-level of panels being displayed as the multi-dimensional icon so that, while the sub-level is being viewed, the first plurality of panels are no longer accessible without returning to the main level of the hierarchical structure.

2. The method of claim 1, further including receiving user input selecting a panel of the multi-dimensional icon and using an operating system on the client device to act upon the selection according to a user configuration.

3. The method of claim 1, further including automatically modifying the multi-dimensional icon to include a subset of panels that have been dynamically updated.

4. The method of claim 1, further including receiving a user input selecting a panel of the multi-dimensional icon, launching an application associated with the panel and passing a set of application parameters associated with the panel.

5. The method of claim 1, further including displaying an update of one of the panels of the multi-dimensional icon, receiving a gesture to dismiss the update, and returning the multi-dimensional icon to its appearance prior to displaying the update.

6. The method of claim 1, further including receiving user input to add a new panel to the multi-dimensional icon, and, in response to the user input, updating a linking table to add the new panel.

7. The method of claim 1, wherein each panel is displayed as a two-dimensional panel and the multi-dimensional icon is represented as a three-dimensional image.

8. A nonvolatile computer-readable storage including instructions thereon for executing a method implemented at least in part by a computing device, the method comprising:

displaying a first configurable panel of a first multi-dimensional panel group comprising a first plurality of configurable panels, the first multi-dimensional panel group being on a main level of a hierarchical panel structure;

receiving user input to display a second panel in the first multi-dimensional panel group;

transitioning the first multi-dimensional panel group according to a customizable group organization to display the second panel of the first multi-dimensional panel group;

receiving a user input to select the second panel of the first multi-dimensional panel group; and transitioning to a second multi-dimensional panel group comprising a second plurality of configurable panels, wherein the first multi-dimensional panel group forms a multi-dimensional icon and the second multi-dimensional panel group is represented as the multi-dimensional icon after the transitioning to the second multi-dimensional panel group, wherein the second multi-dimensional panel group is one of a plurality of sub-levels, different than the main level, in the hierarchical panel structure and wherein the main level is not accessible while viewing the one of the plurality of sub-levels.

9. The nonvolatile computer-readable storage of claim 8, further comprising receiving user input to add a third panel to the first multi-dimensional panel group.

10. The nonvolatile computer-readable storage of claim 8, wherein the first multi-dimensional panel group is reorganized based on one or more events.

11. The nonvolatile computer-readable storage of claim 8, further comprising using the second panel to launch an application and customizing the launching of the application based on customizable panel parameters associated with the second panel.

12. The nonvolatile computer-readable storage of claim 8, wherein each panel comprises multiple sub-levels, each sub-level including a different plurality of configurable panels.

13. The nonvolatile computer-readable storage of claim 8, wherein the second panel is associated with application content, application functionality, or panel content.

14. The nonvolatile computer-readable storage of claim 8, further comprising adding a third panel to the first multi-dimensional panel group by dragging and dropping the third-panel onto the multi-dimensional panel group.

15. A method of creating a multi-dimensional icon on a mobile phone, comprising:

displaying a current panel in a multi-dimensional icon that includes a first plurality of panels linked together in a user-configurable structure, the first plurality of panels being on a main level of a multi-level structure;

receiving user input to rotate the multi-dimensional icon;

searching in an icon linking table for a next linking panel to display;

using an identification of the next linking panel, to obtain image data to display associated with the next linking panel;

displaying the next linking panel in accordance with the icon linking table;

receiving an input to select the next linking panel;

searching the icon linking table for a sub-level associated with the next linking panel; and displaying a second plurality of panels belonging to the sub-level, wherein the second plurality of panels are displayed as the multi-dimensional icon, so that the first plurality of panels on the main level are no longer accessible while the sub-level is currently being viewed.

16. The method of claim 15, further including receiving user input to customize the multi-dimensional icon, and modifying the icon linking table to reflect the user input.

17. The method of claim 16, wherein the customization is adding a new panel to the multi-dimensional icon.

18. The method of claim 16, wherein the customization is changing a function of an existing panel.

19. The method of claim 15, further including dynamically updating a panel of the multi-dimensional icon based on a push-notification received by the mobile phone.

20. The method of claim 1, wherein each panel is an only panel displayed on a side of the multi-dimensional icon.

21. The method of claim 1, wherein the second plurality of panels are linked together using the user-configurable structure.

* * * * *